United States Patent [19]

Pigout

[11] Patent Number: 4,724,645
[45] Date of Patent: Feb. 16, 1988

[54] ORIENTABLE ARCHITECTURAL STRUCTURE

[76] Inventor: Jean-Noël Pigout, 15 rue des Maisons-Neuves, 91700 Sainte Genevieve des Bois, France

[21] Appl. No.: 878,965
[22] PCT Filed: Sep. 25, 1985
[86] PCT No.: PCT/FR85/00262
   § 371 Date: May 21, 1986
   § 102(e) Date: May 21, 1986
[87] PCT Pub. No.: WO86/02118
   PCT Pub. Date: Apr. 10, 1986

[30] Foreign Application Priority Data

Sep. 25, 1984 [FR] France ............................ 84 14726

[51] Int. Cl.$^4$ ........................ E04B 7/16; E04B 1/346
[52] U.S. Cl. .................................................. 52/65
[58] Field of Search ................................. 52/64–66, 52/167, 236.2, 72; 49/40

[56] References Cited

U.S. PATENT DOCUMENTS

| | | | |
|---|---|---|---|
| 1,101,372 | 6/1914 | Wisniewski | 52/64 |
| 3,091,056 | 5/1963 | La Porte | 52/66 |
| 3,359,682 | 12/1967 | Clark | 49/40 |
| 3,370,380 | 2/1968 | Petros | 52/64 |

FOREIGN PATENT DOCUMENTS 44582  6/1961  Poland ............................ 52/167

*Primary Examiner*—James L. Ridgill, Jr.
*Attorney, Agent, or Firm*—Russell E. Hattis; Lawrence J. Bassuk

[57] ABSTRACT

The invention relates to an orientable architectural structure which is habitable. This revolving structure comprises an external generally spherical enclosure (1) which can rotate about its vertical axis V, and a fixed skeleton (2,3,4) housed in the space inside the enclosure. The enclosure is mounted in such a way that it is able to rotate, whereas the skeleton is fixed.

16 Claims, 8 Drawing Figures

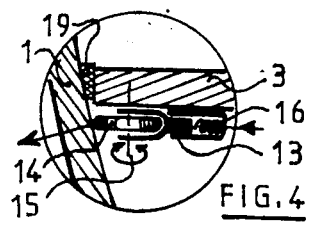
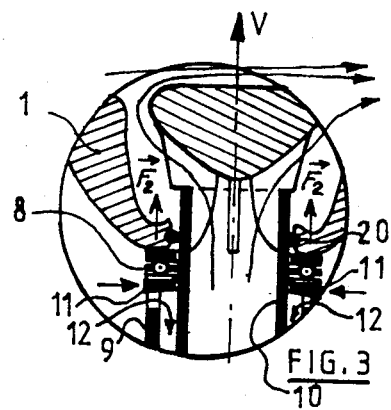
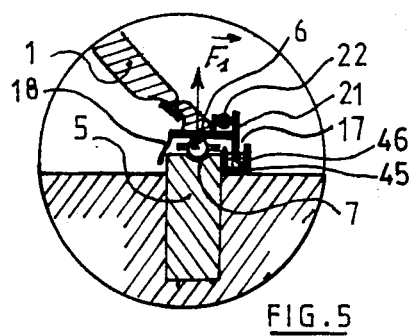
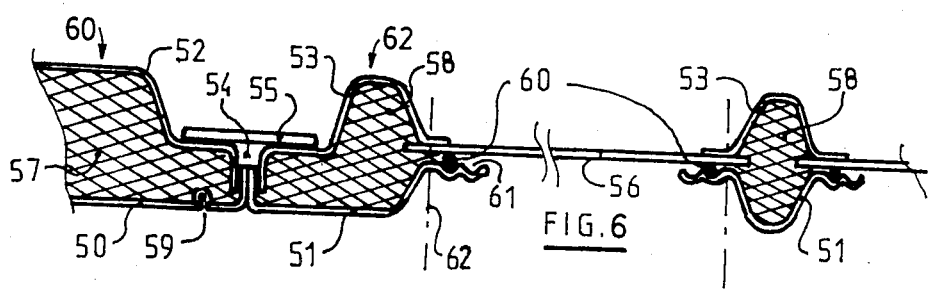

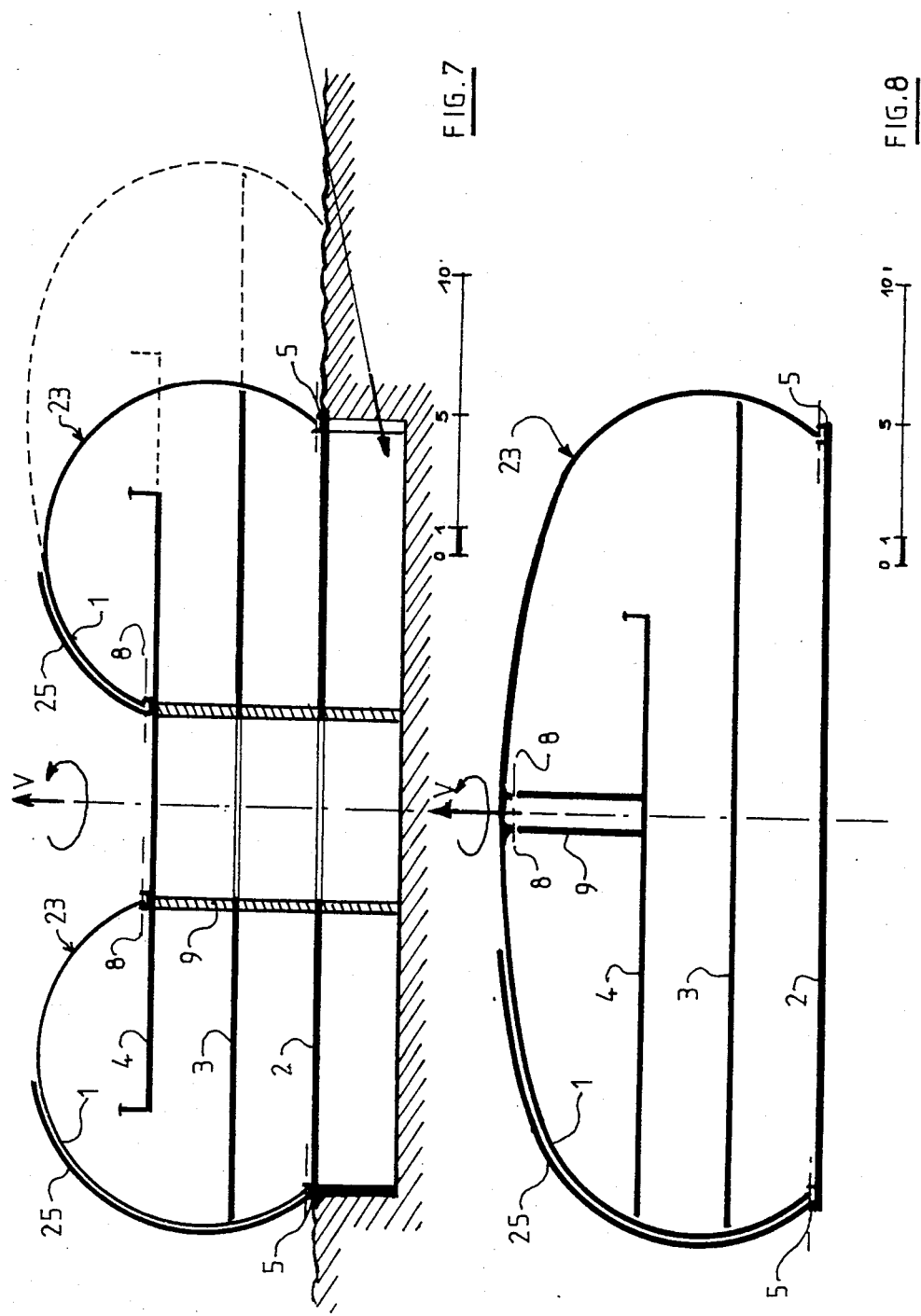

ORIENTABLE ARCHITECTURAL STRUCTURE

This invention relates to an orientable or revolving architectural structure which is habitable.

This orientable structure, comprising an enclosure which can rotate, inside which a fixed skeleton or framework is housed, is especially advantageous in the construction of private houses. It can also be used in the construction of buildings for exhibitions, shows or displays—museums, in particular.

In the field of orientable structures, a technical system is known—particularly that of U.S. Pat. No. 3,125,189—which is used in panoramic restaurants and comprises a circular platform which can rotate and is situated inside a fixed enclosure of the 'picture window' type.

In the field of private houses, another technical system is known—particularly that of patent documents FR-A-No. 2 491 598 and EP-A-No. 0 091 626—according to which the whole structure, i.e. both the external shell and the internal skeleton, can revolve on rails. This solution gives rise to difficulties, and entails very heavy construction costs and enormous energy consumption to enable the whole structure to be moved, owing to its weight, as well as high maintenance costs.

Lastly, it is known that patent document FR-A-No. 2 385 861 proposes another solution for the construction of an orientable dwelling, namely a spherical or approximately spherical house which can rotate about its vertical axis, the lower hemisphere of which is immersed in a tank filled with a supporting fluid. This system presents very many difficulties of stabilization and of practicability.

According to the invention, a new technical solution is recommended for an orientable structure comprising an enclosure or external shell which can rotate and a fixed skeleton housed inside the above-mentioned enclosure. This technical solution differs from the systems previously known and offers the advantage—particularly in comparison with wholly mobile structures—of lower construction costs, less weight to be moved and less energy required to rotate this weight.

The orientable architectural structure according to the invention is habitable and comprises (i) an external enclosure or shell, and (ii) an internal skeleton or carcass. The enclosure has or defines a surface of revolution and is able to rotate about its vertical axis and the space inside the enclosure contains a fixed skeleton.

To sum up, according to the invention the external shell of the architectural structure can rotate, whereas the interior remains fixed.

In the preferred embodiment according to the invention, the orientable architectural structure comprises a steerable rotational enclosure which can rotate about its axis, comprising at least one glazed part selected from among the whole assembly of picture windows and French windows, a fixed skeleton arranged inside the above-mentioned orientable enclosure, a screening element situated outside the enclosure that can screen, at least partially, the above-mentioned glazed part according to the direction in which the enclosure is facing.

The enclosure or external shell defines a surface of revolution which can rotate about a vertical axis or axis inclined to the vertical. This surface can also have a cross section (in plan) which is oval or elliptic. Any rotational form is suitable, but for esthetic reasons and convenience in fitting out the interior, the use of forms of revolution that are approximately circular or oval in section, such as calottes or domes, is preferred. The sphere and the shell oval in section have, in particular, the advantage if integrating well with the natural surroundings and making it easier to fit out the interior space.

In practice, the calotte or dome of revolution which forms the enclosure is such that, in a plane passing through the axis of rotation of the enclosure, the angle corresponding to the arc generating the surface of revolution is larger than $\pi/2$ and smaller than $\pi$ (pi), and advantageously between $\frac{2}{3}\pi$ and $\frac{5}{6}\pi$.

The skeleton situated in the space inside the enclosure or external shell comprises at least one landing or floor, load-bearing or non-loadbearing partitions and one or more staircases, and is connected to the foundations. The skeleton includes a rolling bearing system on which the enclosure rest, making the above-mentioned skeleton and enclosure integral with each other and situated on a plane perpendicular to the axis of rotation of the enclosure.

More specifically, the enclosure is mounted in a way such that it is able to pivot through its base on a circular footing set out on the skeleton. Each landing, floor or storey includes at least one means of rolling which is mounted in a way that provides a seal, to rotate the enclosure relative to the skeleton. The total or partial screening element of the glazed part of the enclosure, situated outside the enclosure, forms a 'wall-blind' which enables the glazed part to be screened according to the direction in which the enclosure is facing. In practice, this screening element will be fixed; nevertheless, in some special cases it will be possible to use a screening element which can also move about the axis of rotation of the enclosure.

It is possible to mask the glazed part with the fixed 'wall-blind' type of screening element of a size that is approximately the same as that of the glazed part, and to cause the external shell of the architectural structure to rotate about its vertical axis until the picture window coincides with the blind.

It is also possible to use any other orientation of the enclosure of the architectural structure between 0° and 360° according to the time of day, the season, the view, the lighting, the temperature, etc., in order always to obtain maximum comfort.

Such an arrangement enable all of the advantages of the greenhouse to be obtained, without the disadvantages (too cold in winter without sun and too hot in summer). In addition, it provides a number of other advantages.

The external enclosure or shell capable of rotating about a vertical axis can simply be actuated automatically or be remotely controlled by means of a low-power electric motor which can be controlled by a microprocessor.

A motor of less than 2 horsepower (about 1.47 kW) is sufficient to cause a spherical enclosure or shell from 9 to 10 meters in diameter and weighing about three tons, as described below, to make one complete revolution in two minutes.

Other advantages and characteristics of the invention will be understood better from reading the following description of the appended drawings in which:

FIGS. 3, 4 and 5 show the enlarged details of the structure as shown in FIG. 2;

FIG. 6 is a cross-sectional view showing schematically a method of mounting the hexagonal and/or pentagonal panels which form the enclosure;

FIGS. 7 and 8 show schematically two other structures according to the invention, for larger buildings.

Figure 1:
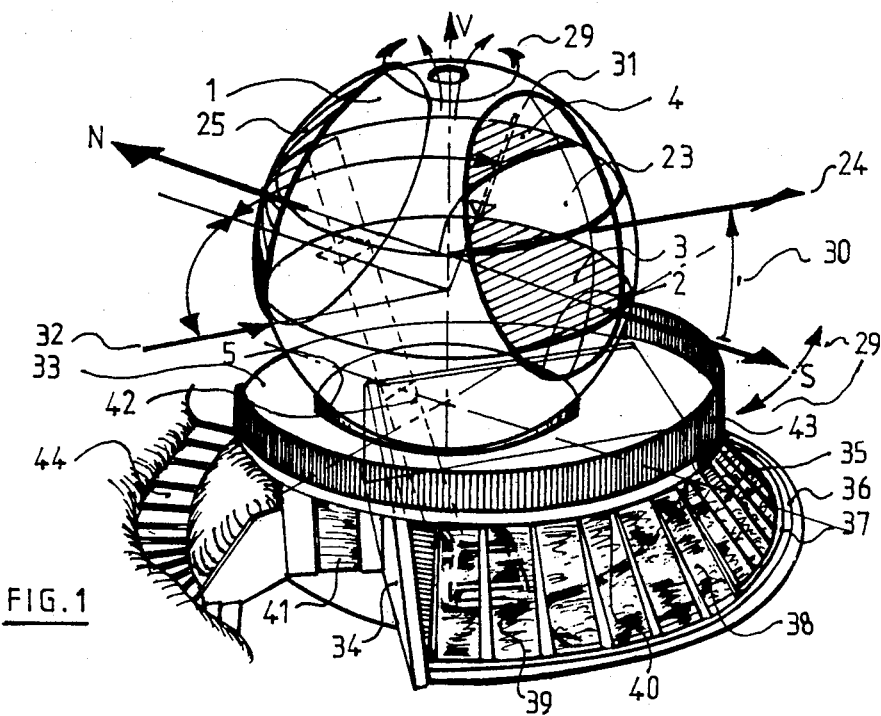
FIG. 1 is a simplified view of an orientable, habitable, architectural structure according to the invention.

The spherical enclosures or shell 1 in FIGS. 1, 2, 7 and 8 rotates about a vertical axis V. Floors 2, 3 and 4 of the skeleton are arranged inside the external enclosure 1 and are fixed and integral with a circular footing 5 on which the spherical enclosure 1 rests, via a circular bearing system which is shown in FIG. 5 and which exerts a supporting force $F_1$.

The bearing system can take a number of different forms. It can consist, as in FIG. 5, of steel balls 6 kept apart from one another by means of interconnected rings forming the bearings cage.

The balls 6 can roll in a circular groove 7 on the footing 5, enabling the spherical shell 1 resting on these balls 6 to pivot. The circular bearing track can also be formed by small wheels fixed to the bottom of the spherical enclosure 1, enabling it to run on the circular footing 5.

To facilitate rotation of the spherical enclosure, locate it more exactly and distribute better the loads and stresses of the structure, it can be advantageous to provide another bearing track 8, as shown in FIG. 3.

The bearing track 8 encircling the axis V rests upon an external tube 9 which is concentric with a tube 10. It supports the upper part of the spherical enclosure 1. A pressure $F_2$ is exerted upwards upon the spherical shell 1. This pressure $F_2$ can be adjusted by lowering the quoins 11 or by any other method. The weight of the spherical enclosure 1 is thus distributed over the circumference of the footing 5 and over the tube 9.

Depending upon the performance of the enclosure 1, it may not be advantageous to provide the upper bearing track 8.

The tubes 9 and 10 rest upon the central part of floor 4 of the structure according to the invention. Fumes and used air can be evacuated outside the structure through tube 10.

The recycled air of the structure is sucked between tubes 9 and 10 and through the ports 12 on the upper periphery of tube 9. The new air will be largely introduced through inlets (not shown here) situated on the periphery of floor 3.

The other details of FIG. 3 show a system for evacuating fumes which avoids the need for a chimney projecting from the top of the spherical shell—which would greatly impair the esthetic appearance of the structure as a whole, viewed from outside.

One of the systems 13 which enable the spherical enclosure 1 to be kept on its axis of rotation V is shown in FIG. 4. The systems 13 are integral with floor 3 and are placed at its periphery.

Each system 13 consists of a small wheel 14 which rotates about an axle 15 and maintains a pressure $F_3$ upon the spherical enclosure 1 via the spring 16. Other systems may be suitable for providing the same function. It is possible also to dispense with this arrangement if the bearing system for the spherical enclosure 1 and the shell itself otherwise allow this.

To perfect the system of rotation of the external enclosure, a sealing system is provided at the intersection between the planes of rotation. In FIG. 5 the device 17 consists of a circular channel 45 laid flat against the footing 5. This channel is filled with an inert liquid 46 which has little tendency to evaporate, in which a hooping 21 runs which is integral with the base of the spherical shell 1. A perfect seal is obtained by this method.

A skirt 18 formed of flexible elements enables the insulation to be improved and protects the bearing system.

This sealing channel can be installed outside the circular footing 5 and be allowed to fill naturally with rainwater.

A gasket 19 (FIG. 4) is interposed between floor 3 and the shell 1, and consists of a light material such as natural or artificial felt, enabling the spherical shell 1 to slide with a minimum of friction. This gasket must also have very good thermal insulation properties and especially properties of acoustic insulation.

The gasket 20 in FIG. 3 must be very flexible in order to absorb the differences of concentricity of the spherical enclosure 1 with the central tube 10.

A nylon cord 22 (FIG. 5) is held in place on the periphery of the footing for the spherical enclosure 1 by means of a channel integral with the hooping 21, and has the function of a belt for the circular footing which serves as a pulley for it.

A system of motorization is provided which will be installed in an appropriate place on floor 2 (in the laundry, for example). This system comprises idlers and guide rollers for the cord 22, a drive roller on which the cord 22 will be wound several turns in order to provide a coefficient of adhesion sufficient to drive the spherical enclosure 1, and an electric motor (not shown here) with its reduction gear which will drive the whole assembly. An emergency crank-handle drive which can be installed directly at the end with the drive roller can be provided also.

Other driving systems which may be just as suitable are conceivable. The one described is very simple and easy to maintain. This simplicity is possible owing to the very slow movement (maximum of 1 complete rotation of the external shell 1 in 1 minute) and the small number of movements which have to be made (averaging the equivalent of from 2 to 3 rotations at most per day).

The system of rotation of the spherical enclosure 1 which is described above can be embodied in different ways. However, for it to be satisfactory the following must be observed:

good geometry of parts in contact for rotation with close tolerances (bearing race tracks, guides, gaskets);

good quality rolling components (ball races, wheels carried in ball bearings, etc.), in order to provide perfectly satisfactory driving torques, and with a minimal starting coefficient of adhesion in order to enable a small motor to be used for this actuation;

minimum weight for the spherical enclosure 1 which will have to be rotated and which must also have minimal inertia;

a simple, rugged motor-drive system with manual restarting facility;

also provided for are control sensors which are essential for angular positioning.

The spherical enclosure 1 includes a large section of picture window 23, the opening angle of which is about 100° here, with an axis 24 inclined at 30° to the horizontal plane. This inclination enables a maximum amount of sunshine to be captured during the winter and mid-season periods at the latitudes of Europe, North America, etc. The picture window 23 represents here an area of about 45 m². The axis 24 of the picture window will thus pivot about the vertical axis V and will be positioned according to the season, the position and intensity of the sun, etc.

Figure 2:
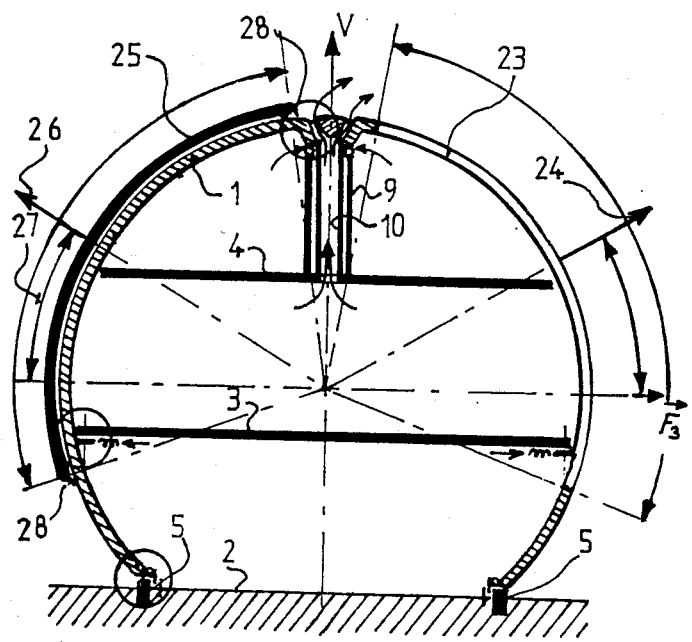
FIG. 2 is a section through the structure in FIG. 1.

The 'wall-blind' or screening element 25 in FIGS. 1 and 2 is preferably exposed to the North and has facing the enclosure the same shape and area as the picture window 23. It is also inclined at 30° to the horizontal plane. A layer of air, preferably about 10 cm thick, is provided between this fixed 'wall-blind' and the rotatable spherical enclosure 1.

The 'wall-blind' or screening element 25 is made up in the same way and with the same constructional modules as the spherical enclosure 1. The difference in radius, preferably about 25 cm, which exists between theses two spherical surfaces forms poses no difficulty, in view of the space provided, which does not need to be exact. The weight of this 'wall-blind' slow because it is constructed on the basis of light materials (about 700 kg for the example used). It will thus be attached to the ground by means of a supporting structure at its base and on the upper part of the external enclosure it will rest upon casters placed beneath the blind for protection. A simple sealing system 28 is provided for the periphery of the 'wall-blind' 25 in order to ensure good thermal and acoustic insulation and to prevent the admission of wind.

The 'wall-blind' 25 can also rotate about the vertical axis (V), with its supporting structure on small wheels guided along a circular rail track concentric with the footing 5.

The 'wall-blind' 25 can also be integral with two lateral articulated arms following a horizontal axis passing through the center (only in the case of a sphere). This axis is embodied in pivots situated on either side of, and diametrically opposite, the external enclosure 1.

These last two possibilities enable additional combinations of screening, protection and energy capture of the 'wall-blind' 25, which in this instance is mobile. The complexity of the system is increased considerably, however.

It will likewise be possible to provide a system of sprinkling on the upper part, enabling water to run along the spherical wall of the enclosure 1, incorporating a cleaning system. This sprinkling facility also enables a fresh temperature to be maintained inside the structure, by positioning all or part of the picture window 23 beneath the 'wall-blind' 25 and having water flow over the latter, removing heat by evaporation.

The picture window 23 could consist of polycarbonate single glazing between 4 and 6 mm thick, allowing for the possibility of protection beneath the 'wall-blind' 25 as soon as heat exchange with the air outside becomes unfavorable.

In addition, it is advantageous in certain cases if the heat exchange can take place through the picture window, as stated above.

The use of single glazing in polycarbonate or some other transparent synthetic compound reduces the weight and cost of this picture window, while at the same time providing greater safety, compared with double or triple glazing in glass.

In the structure as shown in FIG. 1, two favored access places are provided on floor 3 in FIG. 1: a first access—called the main access—following axis 31 on the East side situated at an angle of 72° to the North axis (N), and a second access (on a balcony or elsewhere), following axis 32 on the West side situated at an angle of 288° (−72°) to the North axis (N).

In addition, the following are provided on the periphery of the spherical enclosure 1:

7 French windows with sliding shutters which are motor-driven and remotely controllable, 1 French window situated on floor 4 opposite the picture window, 3 French windows on the main floor 3 at 72°, 180°, 288°, respectively from the North axis (N) for a position of 180° (due South) from the axis 24 of the picture window, 3 French windows on the lower floor situated beneath the French windows of the main floor 3 and giving direct access onto the lower terrace or to the ground.

The structure in FIG. 1 forms a dwelling unit as such, but it is possible to provide an additional reception section of this structure in the basement, which would help to improve further the quality of life and the possibilities afforded by the unit.

In FIG. 1 a bionic or even bioclimatic space is shown, which breaks down as follows:

a circular terrace 33 on which the structure rests, slightly off-center and to the rear; this terrace 33 itself rests upon two load-bearing walls 34 forming an angle of 90° and on walls set out below the lower periphery of the terrace 33;

on the front preferably facing due South, a picture window 35 in the arc of a circle over about 120° and inclined at 45° enables maximum exposure to the sun; this picture window will be sub-divided into straight panels, all identical, assembled in two groups and able to slide on two concentric rails 36 and 37; it is possible to open this picture window wholly or partially, up to one-half of its total length; this opening, variable according to requirements, can be turned to face South-East or South-West;

a swimming pool 38, in the shape of an arc of a circle, is provided beneath this picture window for best exposure to the sun;

on the left side in the front view, a passage 39 is provided, sufficient for garaging a car; also, on the right side a passage about one meter wide is provided.

Two concentric rails situated on the top in 40 of the picture window 35 support it and enable it to slide along.

Various systems and automatic mechanisms are provided to screen the picture window 35 according to the sunshine upon it, removing or recovering the heat that is available according to the season and the degree of solar irradiation.

The swimming pool 38 is likewise permanently covered over by a system which enables it to recover, under the best conditions, the heat available at the surface, avoiding the evaporation which would saturate this space with moisture. This pool cover 38 is retractable into the bottom.

The heat or cold recovered on the picture window 35 and on the swimming pool 38 can be stored in the foundations of the bionic space (latent heat accumulator/exchanger system). This stored heat or cold will then be used to heat or cool the bionic space and the structure by means of a suitable forced air circulation system.

The central interior of the bionic space can be used for relaxation and leisure purposes: gymnastics—games—swimming in the pool—DIY work—parties, etc. It is very suitable also for original decoration and for growing exotic plants which require light, heat and humidity.

An entrance hall 41 is provided also, as is a staircase/elevator 42 which starts from the bottom of the bionic space to connect, from inside, three floors (bionic space, floor 2, floor 3).

A hand-rail 43 is mounted around the terrace 33 and there is also an external flight of steps 44 providing access to the terrace 33, and also another flight of steps on its extension, enabling the main entrance to the structure then to be reached, which is situated along axis 31.

The enclosure provides advantageously a modular structure which contains curved modules or panels with a surface with shapes that are approximately regular pentagonal and/or hexagonal, or even triangular, the sides of the pentagons, hexagons and, where they exist, equilateral triangles being arcs of approximately the same curvature. Such a division of the enclosure into modules provides a good compromise between esthetic and technical requirements, having regard to the dimensions, heights, weights, areas, strengths, transportability, manufacture and installation of the modules.

The element 25 screening the glazed section is likewise of modular form—which is an advantage.

As shown in FIG. 6, each module can be constructed of reinforced resin; inside the spherical enclosure 1, thin (about 3 mm) casings, 50 and 51, can be molded in reinforced resin in several layers. The same applies to the outside for casings 52 and 53. These casings are then interlocked and welded together so as to be completely tight. The space between these two casings is previously reinforced by a light, but strong, honeycomb structure 57 and 58, which can also be a filling of injectable, open-cell foam.

A composite unit 60 formed of portions 50, 52, 57 formed in this way can be a prefabricated pentagonal or hexagonal element. The same applies to a composite unit 62 formed of portions 51, 53, 58 incorporating glazing 56, which can form a pentagonal or hexagonal glazed element.

A valve 59 enables a partial vacuum to be formed in the elements other than picture windows, to improve further the thermal and acoustic insulation from the outside. A visual control device and a 'microprocessor' will be provided also, in order to enable the quality of the vacuum in each element to be checked, for periodic reconditioning. Also, the microprocessor, which is active with the contact closed when the partial vacuum is satisfactory, will be able automatically to signal any escape to the central control station. This escape can take place naturally through time if the partial vacuum has not been reconstituted, and it can also take place suddenly in the event of forcible entry, thus triggering an alarm.

The various elements are then assembled together by means of glued and/or bolted strips 55.

A space 54 is provided in the joints of the elements, to allow remote-control cables, remote signalling equipment, electricity supply cables, etc., to pass through.

For the glazed elements, gaskets 60 and gutters 61 must enable waterproofing to be ensured, fixed by parts being pressed together as at 62.

According to another embodiment, the modules forming the enclosure can be lightweight construction panels—of lightweight colloid concrete with a density less than or equal to 1 and a high tensile strength and flexural strength, the panes of the glazed panels being insertable in a colloid-concrete reinforcement and all of the panels of the enclosure being assembled according to a known method.

The example of embodiment in FIG. 7 relates to a double orientable architectural structure approximately to the scale of 1:200 for a larger building than that in FIG. 1, which could be an exhibition hall, a museum, a restaurant or similar building. The principle of operation is identical with that described above, with the possibility of having two 'wall-blinds' 25 and two picture windows 23. In this case the three floors of the structure of the invention total approximately 1,625 m$^2$ of furnishable area for the circular cross section and 3,700 m$^2$ for the oval section indicated by the dotted line. The axis of rotation of each enclosure 1 is inclined to the vertical here.

The example of embodiment of FIG. 8 relates to an architectural structure according to the invention, approximately to the scale 1:200 for a building oval in section, still with three floors and comprising a total furnishable area of 1,500 m$^2$.

Construction of the building as in FIGS. 7 and 8 is particularly easy, by first installing the interior of the structure built on the basis of a central column with beams and pillars set out towards the outside. The external structure is then mounted and rests upon a motorized runway. The main access into these structures can be via an inclined ramp running from the outside and ending in the basement at the foot of the internal service core.

Information in no way limitary has been given here relating to the construction of a private house as shown in FIG. 1 with its bionic space.

A. ARCHITECTURAL STRUCTURE
* Diameter of external spherical enclosure: 9 meters
* Overall height: 8 meters
* Diameter of apparent circle of glazed calotte: 6.5 meters.
* Opening angle of glazed calotte, approximate: 100°
* Angle of inclination of axis of glazed calotte to horizontal: 30°
* Corresponding glazed area, approximate: 40 m$^2$
* Area of rear spherical calotte constituting fixed 'wall-blind', corresponding to picture window, approximate: 45 m$^2$
* External area (excl. bottom): 226 m$^2$
* Area at bottom: 33 m$^2$
* Total external area: 259 m$^2$
* Total cubic content: 363 m$^2$
* Inside diameter of circular base, approximate: 5.5 m
* Equivalent habitable diameter, corresponding to lower floor: 6.5 m
  Corresponding habitable area: 33 m$^2$
* Useful diameter of intermediate habitable floor: 8.5 m
  Corresponding habitable area: 56.7 m$^2$
* Useful diameter of upper habitable floor: 6.75 m
  Corresponding habitable area (excluding empty space over parlor): 21.0 m$^2$
* Area of empty space over parlor: 15 m$^2$
* Total habitable area, approximate: 110 m$^2$
* Approximate weight of one pentagonal element of spherical shell: 80 kg
* Approximate weight of one hexagonal element: 120 kg
* Approximate weight of whole spherical shell: 3 tonnes
* Approximate weight of rear 'wall-blind': 700 kg
* Runway of spherical shell at base and on upper part, on ball bearings or wheels carried in ball bearings.

* Lateral hold and guidance of spherical shell by system of wheels on ball bearings with springs attached to periphery of intermediate floor:
* Drive for spherical shell by belt/nylon cord system, electric motor reduction gear: 2
* Driving speed: 0.5 rev/min
* Angular displacement about vertical axis of from −108° to +468° (i.e. total of 1.6 revolutions)
* Power consumed in 24 h for all automatic mechanisms, which can be limited to: 100 VA
* Openings formed by motor-driven French windows (FW) with motor-driven shutters sliding downwards in spherical shell:
  lower floor: 3 FW
  main floor: 3 FW
  upper floor: 1 FW
* External access steps starting from level of circular terrace and ending on a landing situated at 72° to North axis.
* Internal staircase/elevator to bionic space, lower floor and main floor.
* Spiral staircase connecting main floor to upper floor.
* Forced air-conditioning with storage of energy of latent heat in ground.
* Arrangement of three floors:
  Lower floor (33 m$^2$):
    1 bedroom/office,
    1 bedroom,
    1 laundry,
    1 bathroom and WC.
  Main floor (56.7 m$^2$)
    1 kitchen to North-West, WC,
    Entrance hall,
    Store-cupboards situated to North-East, on whole part in front of lounge containing dining area, mini-bar, bath, chimney situated about 0.75 meter behind center.
  Upper floor (21 m$^2$):
    equipped in master bedroom on mezzanine floor with clear space overhanging lounge, bathroom and WC, store-cupboards and hot-water storage.
* Dust extraction system.
* System of remote control, remote signalling and alarms integrated with the structure.
* Sensors for position, temperature, solar irradiation, alarms, water levels, etc., connected to microprocessor.
* Microprocessor and operational programs for the whole structure, with manual restarting facility.
* Battery charging unit, providing independent operation of the architectural structure according to the invention for 1 week.

B. BIONIC SPACE
* Diameter of upper terrace: 11 m
* Total furnishable area: 110 m$^2$
* Opening angle of picture window from its center, approximate: 120°
* Inclination of picture-window panes: 45°
* Length of swimming pool in circular arc below picture window: 10.3 m
* Width of swimming pool: 2.5 m
* Depth of swimming pool: 1.5 m
* Area remaining around pool for recreation, approximately: 45 m$^2$
* Other installations:
  Entrance hall,
  Cellar+store-room
  Complete studio apartment.
* Equipment room behind staircase/elevator.
* Possibility of garaging one automobile on one side of swimming pool.
* Possibility of underfloor latent-heat storage, up to: 40 m$^3$
* System of heat or cold recovery from picture window and swimming pool.
* Etc.

According to the same embodiment, private houses of about 125 to about 145 habitable m$^2$ have been provided for, offering more comfort than the above embodiment, each of these private houses being provided with a bionic space.

The invention described is in no way confined to the embodiments described and presented by way of illustration above, of course. It can have very many variants available to those skilled in the art, according to select criteria, without departing from the scope of the invention.

Thus, it is possible to extrapolate much larger forms approximately oval in section, capable of accommodating offices, theaters, restaurants and other public premises, giving them a futuristic, functional and very attractive appearance.

Thus, as a variant, the screening element (25) of the glazed part of the enclosure can be situated inside it; in this type of embodiment this screening element is fixed and forms part of the skeleton.

Generally speaking, it seems that the orientable structure according to the invention must not be very high, so that better integration in the surrounding landscape is achieved, and that it is advantageous not to have more than three furnishable floors, with the third floor including a space leading down to the second floor, which is the main activity floor.

What is claimed is:
1. An orientable architectural structure, which can be habitable, comprising:
   (i) an enclosure (1) that defines a surface of revolution, and that is rotatable about its axis (V), said enclosure enclosing an interior space having a base and including at least one glazed part (23) having windows;
   (ii) a fixed non-movable skeleton (2, 3, 4) housed in the space interior said enclosure;
   (iii) a screening element (25) adapted to mask at least partially, when needed, said glazed part (23) as a function of the orientation of said enclosure; and
   (iv) a rolling bearing system (5) set out on said non-movable skeleton and mounting said enclosure at the base thereof for said enclosure to rotate when needed relative to said non-movable skeleton.

2. The structure of claim 1 in which said enclosure includes an upper part adjacent its axis and said skeleton includes a bearing engaging said upper part for said skeleton to support said upper part of said enclosure.

3. The structure as claimed in claim 1, wherein the enclosure (1) is modular and consists of curved panels of a regular geometric shape.

4. The structure as claimed in claim 1, wherein the axis (V) of rotation of the enclosure (1) is vertical.

5. The structure as claimed in claim 1, wherein the axis (V) of rotation of the enclosure is inclined to the vertical.

6. An orientable structure according to claim 1, wherein said screening element (25) is situated inside the said enclosure (1).

7. an orientable structure according to claim 6, wherein said screening element (25) is fixed and non-movable.

8. The structure as claimed in claim 1, wherein the fixed skeleton includes at least one floor.

9. The structure as claimed in claim 8, wherein each floor is provided with at least one means of rolling mounted in a sealed way, for rotation of the enclosure (1) relative to said skeleton.

10. The structure of claim 1 in which said enclosure is substantially spherical.

11. The structure of claim 10 in which said screening element defines a partial spherical surface.

12. The structure of claim 1 in which said enclosure defines a surface of revolution having an arc larger than $\pi/2$ and smaller than $\pi$.

13. The structure of claim 12 in which said arc is between $\frac{1}{8}\pi$ and $\frac{2}{3}\pi$.

14. An orientable structure according to claim 1, wherein said screening element (25) is situated outside the said enclosure (1).

15. An orientable structure according to claim 14, wherein said screening element (25) is fixed and non-movable.

16. An orientable structure according to claim 14, wherein said screening element (25) is rotatable about the axis (V) of said enclosure (1).

* * * * *